United States Patent

Casper

[15] 3,678,492
[45] July 18, 1972

[54] OPTO-ELECTRONIC SCENE MONITORING SYSTEM

[72] Inventor: Robert P. Casper, Los Angeles, Calif.

[73] Assignee: Hughes Aircraft Company, Culver City, Calif.

[22] Filed: Oct. 26, 1970

[21] Appl. No.: 84,028

[52] U.S. Cl. ..................340/258 B, 178/DIG. 33, 250/221
[51] Int. Cl. ......................................................G08b 13/18
[58] Field of Search............340/258 B, 258 R; 178/DIG. 33, 178/7.6; 270/71.5; 250/221

[56] References Cited

UNITED STATES PATENTS

| | | | |
|---|---|---|---|
| 1,790,491 | 1/1931 | Smith | 178/7.6 |
| 1,990,183 | 2/1935 | Gray | 178/7.6 |
| 3,475,608 | 10/1969 | Pardes | 178/DIG. 33 |
| 2,410,424 | 11/1946 | Brown | 340/258 R |
| 2,493,543 | 1/1950 | Merchant | 340/258 B |
| 3,336,585 | 8/1967 | Macovski | 340/258 B |
| 3,476,947 | 11/1969 | Burney | 178/DIG. 33 |

Primary Examiner—John W. Caldwell
Assistant Examiner—Marshall M. Curtis
Attorney—Ernest L. Brown

[57] ABSTRACT

An intrusion detection system is disclosed in which a scene under observation is scanned by a rotatable scanning mechanism with each revolution thereof defining x scene scan periods. Signals from each transducer, associated with the scanning mechanism, are recorded on a magnetic drum. The latter revolves one revolution per y revolutions of the scanning mechanism. Two read heads per transducer are positioned at the drum at a radial angle $\theta = (360/x) \cdot (1/y)$. The signals from the two read heads are compared to provide an alarm indication whenever their difference exceeds a selected threshold level.

10 Claims, 6 Drawing Figures

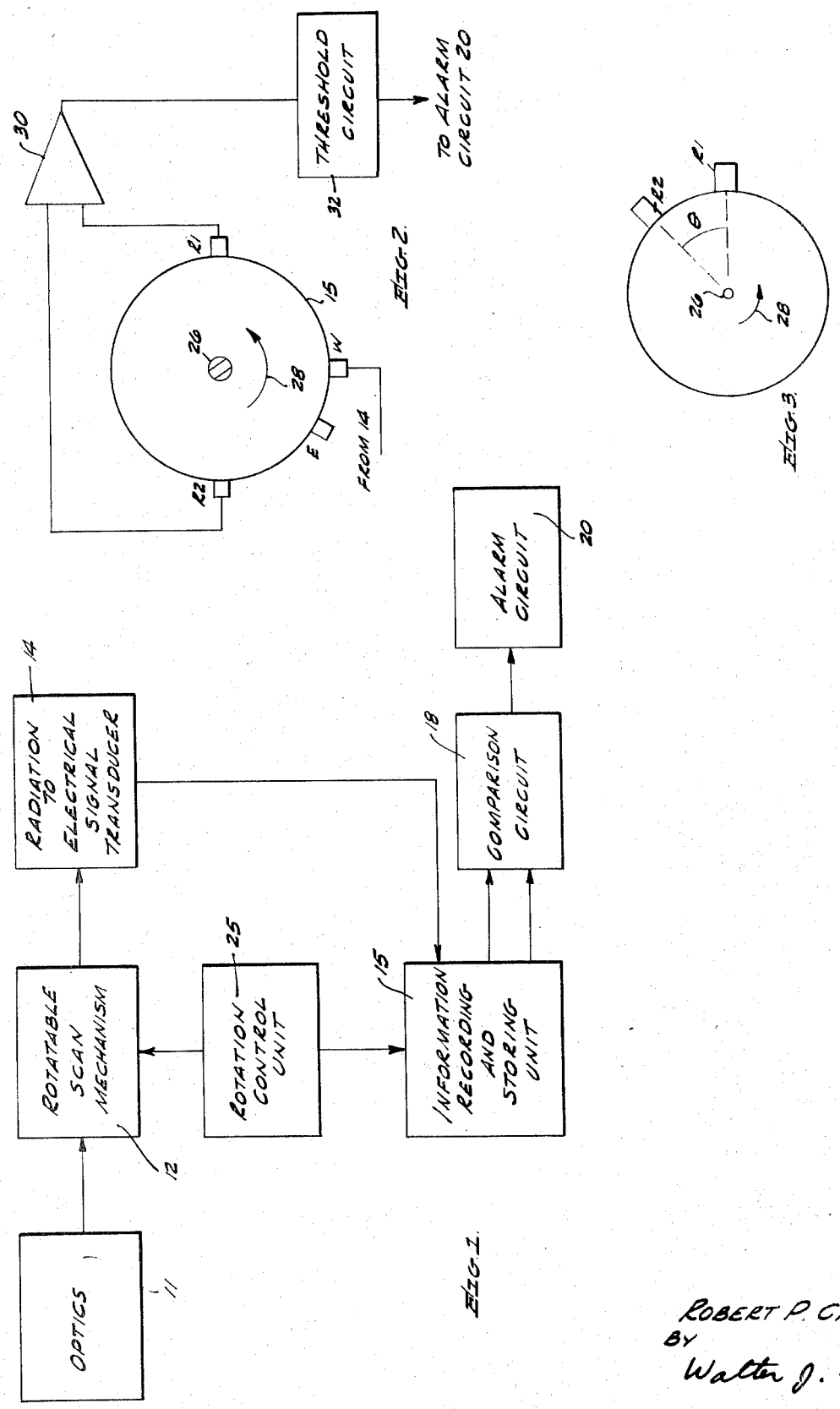

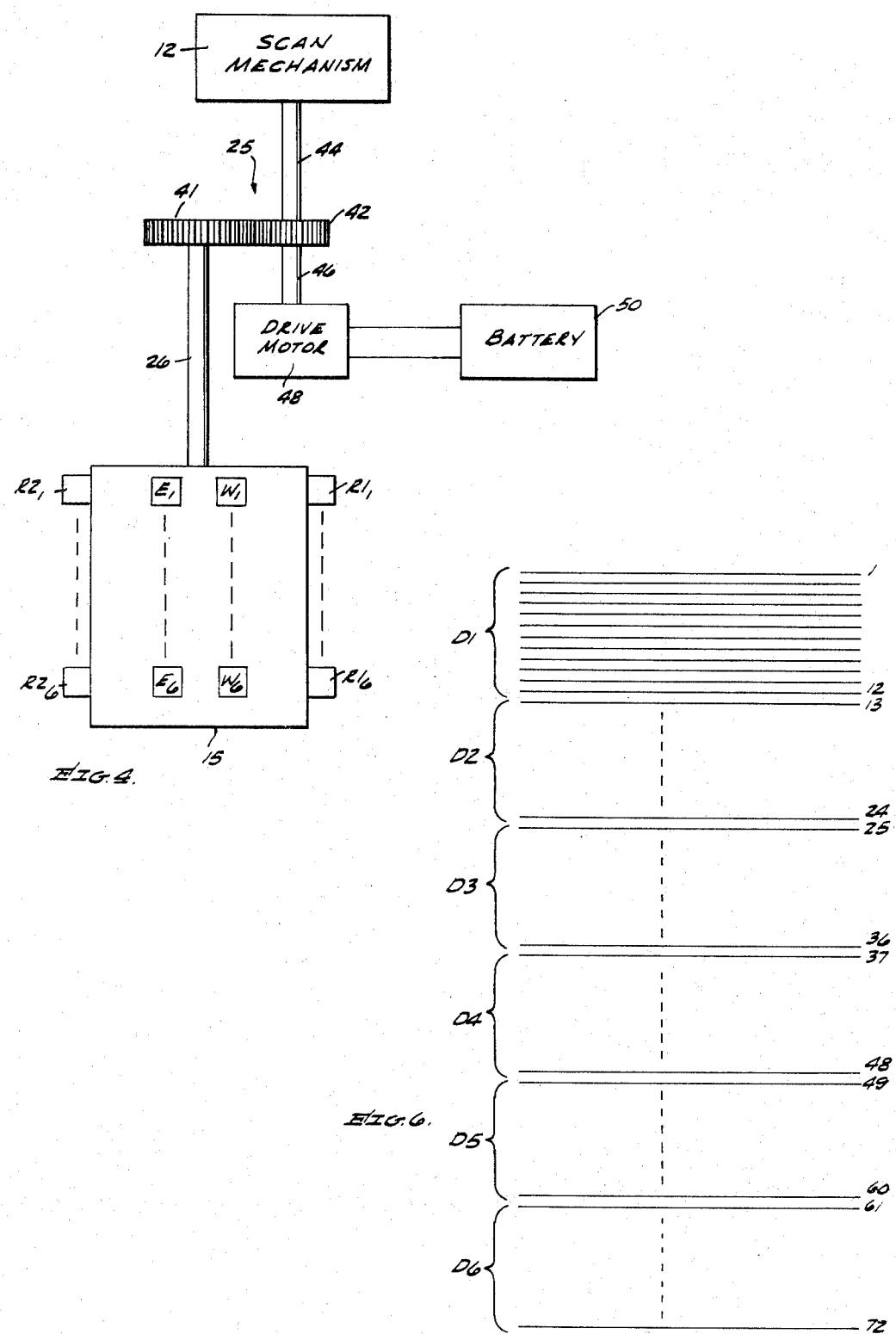

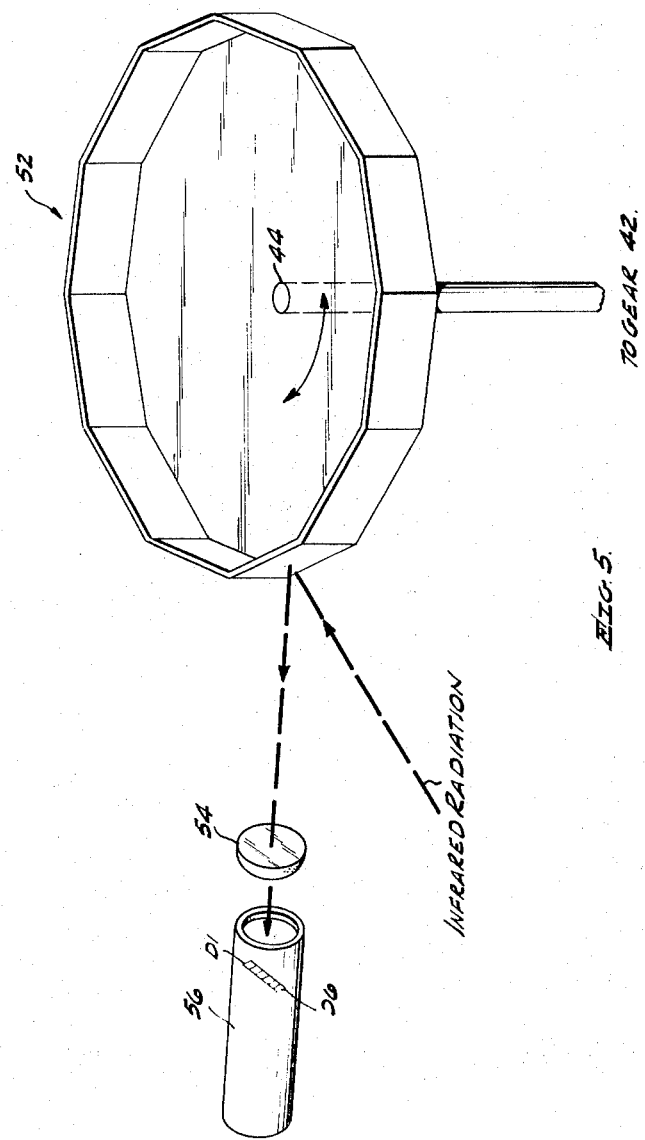

OPTO-ELECTRONIC SCENE MONITORING SYSTEM

BACKGROUND OF THE INVENTION

1. Field of the Invention

The present invention is directed to an opto-electronic monitoring system and, more particularly to a system for the detection of changes in the content of a monitored scene.

2. Description of the Prior Art

There are many applications in which it is necessary to detect changes or variations in the content of a monitored scene. For example, in an intrusion detection device, the scene content in the field of view of the device is continually monitored to sense changes therein which are indicative of intrusion into the scene under observation. Most prior art devices or systems are of the 'active' type. That is, they emit radiation in the form of light, ultrasonic waves, etc., to the region under surveillance. The radiation is then monitored to detect the entrance of an object into the radiated beam or motion of an object within the controlled region. A 'passive' system would be preferable, since it would eliminate the need to direct radiation to the region, and therefore would be less susceptible to jamming. Among desired features of such a system are high reliability without being too expensive to enable its wide application and use. The latter could only be attained by providing a simple and reliable scene scanning arrangement, which coacts with simple means for receiving and processing the signals received therefrom. None of the prior art devices possesses these properties.

OBJECTS AND SUMMARY OF THE INVENTION

It is a primary object of the present invention to provide a new improved system for detecting changes in a region under control.

Another object of the present invention is to provide a highly reliable, yet relatively inexpensive, intrusion detection system.

A further object of the present invention is to provide a passive intrusion detection system with a novel highly reliable, yet simple arrangement for monitoring the region or scene under control and for detecting intrusion or changes therein.

These and other objects of the invention are achieved in a system in which electromagnetic radiation, gathered from the scene by means of optics and scan mechanism, is converted into electrical signals during each of a succession of scan sampling periods. Signals from successive sampling periods are compared on either a point-by-point basis or as scan sampling period integrated signals. If the difference between the compared signals exceeds a selected threshold level, an alarm circuit is activated.

In an embodiment in which the scan mechanism includes a rotatable multisided prismatic mirror, which is located in the path of the radiation, the signals from successive scan sampling periods are temporarily stored on a rotatable signal storing medium, such as a magnetic drum. The latter is coupled to the rotatable mirror to insure proper registration of the stored signals for point-by-point comparison irrespective of long term changes in the rate of rotation of the mirror.

The novel features of the invention are set forth with particularity in the appended claims. The invention will best be understood from the following description when read in conjunction with the accompanying drawings.

BRIEF DESCRIPTION OF THE DRAWINGS

FIG. 1 is a general block diagram of the present invention;

FIGS. 2 through 4 are diagrams useful in explaining the principles of the present invention;

FIG. 5 is an isometric view of one embodiment of a scanning mechanism; and

FIG. 6 is a scan pattern diagram produced with the scan mechanism shown in FIG. 5.

DESCRIPTION OF THE PREFERRED EMBODIMENTS

Attention is first directed to FIG. 1 wherein numerals 11 and 12 respectively designate optics and a scan mechanism. The latter is assumed to be of the rotatable type, designed to scan the scene of interest during a succession of sampling periods, hereafter also referred to as the scan periods. Electromagnetic radiation, which is gathered from the scene by optics 11 and scanned by mechanism 12, is supplied to a transducer 14. The latter converts the scanned radiation into corresponding electrical signals proportional to radiation gathered from the scene. The electrical signals, representing scene information contained in one scan period, are recorded and stored in an information recording and storing unit 15, so that they may be available for retrieval and comparison with corresponding electrical signals produced during a succeeding scan period. Corresponding signals from successive scan periods are compared by a comparison unit 18, whose output triggers an alarm circuit 20 only if the difference between the two compared signals exceeds a selected threshold.

Although the basic principles of operation of the invention seen straightforward, a serious problem is encountered in the implementation of the basic concept of operation. The problem relates to the storing of the signals from two successive scan periods to insure that corresponding signals from two successive scan periods are compared, irrespective of changes of the scan period. If the scan period were not subject to change, relatively simple means, such as a delay line, providing a delay exactly equal to the scan period, could by used to store the signals obtained during one scan period for comparison with signals received during a succeeding period. However, maintaining the scan period to be fixed without subject to any change, particularly over long intervals of operation, is difficult and cannot be attained without increased system complexity and cost. Fixed scan period is nearly impossible to achieve in a portable system in which the power source is a drainable battery. Also, it is difficult to achieve precise scan period in remotely located system without frequent maintenance.

In accordance with the teachings of the present invention, these problems are eliminated by employing a rigid rotatable scan mechanism 12 and a signal storing and retrieving unit 15 which is also rotatable, such as a magnetic drum. The rotation of mechanism 12 and the magnetic drum 15 is controlled by a rotation control unit 25, which controls the drum to rotate at a rate which is a fixed unalterable ratio of the rate of rotation of the scan mechanism. Thus, any change in the rate of rotation of mechanism 12 which represents a change in the scan period directly affects the storing and retrieval of signals on the drum in a way which insures that corresponding signals from two different scan periods are available simultaneously for comparison by the comparison circuit 18.

The novel teachings of the present invention may best be explained in connection with a specific example. In the example, to be described hereafter, it is assumed that one complete scan period is represented by one complete revolution of mechanism 12, while drum 15 is assumed to rotate at one half the rotation rate of mechanism 12. As shown in FIG. 2 the drum 15 is assumed to be mounted on a rotatable shaft 26 as indicated by arrow 28. Associated with the drum is a record or write head W, a pair of playback or read heads R1 and R2 and an erase head E. The two read heads are on diametrically opposite sides of the drum.

The output signals of transducer 14 are supplied to write head W so that as the drum rotates the signals are recorded on its magnetic surface, in a manner well known in the art. Signals are erased from the magnetic surface when passing by erase head E. The two read heads R1 and R2 are shown connected to a differential amplifier 30 which forms part of comparison circuit 18. The output of the amplifier is supplied to a threshold unit 32, whose output activates the alarm circuit 20 only when the amplitude of the signal from one read head exceeds the amplitude of the signal from the other read head by an amplitude difference controlled or defined by the threshold level set in unit 32.

As previously assumed, the scan period is represented by one full revolution of the scan mechanism 12 and since the drum revolves at half the rotation rate of the scan mechanism during one scan period, the drum revolves only one-half revolution. Thus, corresponding signals from the same point of the scene, derived during two successive scan periods, are held concurrently stored on the magnetic surfaces at read heads R1 and R2, and it is these stored signals which the differential amplifier compares.

It should be appreciated that if for some reason, such as reduced battery power, the rate of rotation of the scan mechanism 12 decreases, the length of the scan period increases. However, this does not affect the present system, since a related decrease in the rate of rotation of the drum is experienced. Consequently, the time required for a point on the drum surface adjacent R1 to move to R2 is exactly equal to the lengthened scan period. Similarly, the system is not affected by a decrease in scan period length. All that would happen in such a case would be a faster rate of recording of the signals during the period. However, again, as long as a scan period is represented by a full revolution of the scan mechanism, the drum rotates at one-half the rate of the mechanism, and the two read heads are diametrically opposite one another, corresponding signals from the same point of the scene under observation, received during two successive time periods and stored in the drums, would be sensed simultaneously by the two read heads.

It should be stressed that the present invention does not automatically compensate for the difference in the scan period lengths of two successive scan periods. However, such a difference can be disregarded for any reasonable scan rate. Also such a difference may be eliminated by incorporating in the drum 15 a fly wheel, such that the total drum inertia would prevent any meaningful difference in the scan period lengths of two successive scan periods from occurring. Rather, the present invention is primarily directed to compensate for changes or differences between the lengths of scan periods which are spaced apart by a reasonable number of periods, never less than one. Alternately stated, the invention is directed to compensate for scan period changes which are experienced over a reasonably long observation period.

It should be pointed out that the orientation or position of the read heads R1 and R2 on diametrically opposite sides of the drum 14 is only employed in case the rotation rate of the scan mechanism to the drum is 2:1 and the scene is fully scanned by one full revolution of the scan mechanism. Generalizing the positioning of the read heads, it may be stated that they have to be positioned about the drum so as to form a radial angle $\theta$ (see FIG. 3) which is a function of the angular rotation per scene scan period of the scan mechanism and the ratio of the rates of rotation of the latter and the drum. The angle $\theta$ may be defined as $$\theta = (360/x) \cdot (1/y)$$

wherein $x$ represents the number of scene scan periods per revolution of the scan mechanism and $y$ represents the number of revolutions of the scan mechanism per revolution of the drum. Clearly if $x=1$ and $y=2$, $\theta$ as in the foregoing example equals 180°, as shown in FIG. 2. For optimum performance it is preferable to make $\theta$ as small as possible taking into consideration the maximum signal storing density capability of the recording medium on the drum. By making $\theta$ as small as feasible, the affect of small changes in the periods of successive scans is further minimized.

In FIG. 1, a single transducer 14 is shown. For such an arrangement only one write head, one erase head and one pair of read heads are required. If however, the scanning of the scene is performed, with a plurality of transducers, which provide signals representative of the scanned scene, a separate set of heads including 1 write head, 1 erase head and 2 read heads need be provided for each transducer. An arrangement with six such sets is shown in FIG. 4 for a scanning arrangement with six transducers. Also shown in FIG. 4 is a simplified arrangement of the control unit 25, comprising a pair of gears 41 and 42 which are respectively coupled to shaft 26, on which the drum 15 is mounted, and to a shaft 44 connected to the scan mechanism. Also connected to gear 42 is the output shaft 46 of a drive motor 48 which is assumed to be powered by a battery 50.

One embodiment of the optics 11 and the scan mechanism 12 and a six-transducer arrangement of the type which can be incorporated to practice the teachings of the present invention is shown in FIG. 5. Therein, it is assumed that scene scanning is achieved by scanning and detecting infrared radiation (I.R.) from the scene. Basically, the arrangement comprises an N-sided prismatic mirror 52 which reflects IR radiation from the scene to an IR telescope or lens 54. The latter focuses the radiation onto an array of IR detectors or transducers $D_1$–$D_6$ in a detector dewar assembly 56. The mirror is assumed to be mounted for rotation on shaft 44, which defines the mirror's axis of rotation. In the particular example $N=12$. The faces or sides of the mirror 52 are tilted with respect to the axis of rotation so that each face deviates the look angle of the detector array by an amount equal to one resolution element for contiguous scan lines. By rotating the mirror 52 about its axis of rotation an interlaced raster or scan pattern, similar to a TV scan pattern is generated.

The interlaced scan pattern is shown in FIG. 6 for a six-detector arrangement with $N=12$. Such an arrangement produces a pattern with 72 (6x12) lines. Lines 1–12, 13–24, 25–36, etc., represent the outputs of detectors D1, D2, D3, etc. Lines 1, 13, 25, 37, 49 and 61 are formed when one of the sides of the mirror 52 is in the IR path. Succeeding groups, each of 6 lines, are formed as succeeding sides of the mirror are rotated in the IR path.

The outputs of the 6 detectors $D_1$–$D_6$ are respectively supplied to write heads $W_1$–$W_6$. Thus, signals from 6 different points in the scanned scene are simultaneously recorded. It should be stressed that the outputs of each pair of read heads are supplied to a separate differential amplifier for amplitude comparison thereon as previously explained. Thus, the single amplifier, shown in FIG. 2, is assumed to represent one or more amplifiers depending on the number of detectors which are employed and therefore the number of signals which are simultaneously recorded and compared.

Herebefore, it was assumed that the information from sequential scan periods is compared on a point-by-point basis. Such an arrangement provides very high detection sensitivity. For less sensitivity the signals from each scan period can be integrated and compared with the integrated signals from the succeeding scan period.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A system for detecting changes in the content of a scene comprising:
   first means, including rotatable scanning means for scanning said scene through a progression of different angles during each of succession of scan periods and for deriving signals proportional to radiation gathered from the scene during each scan period and which are indicative of the content of said scanned scene;
   rotatable rigid signal storing means for concurrently storing the signals derived by said first means during at least two successive scan periods;
   rotation control means coupled to said rotatable scanning means and to said signal storing means for controlling said signal storing means to rotate at a rate which is at a fixed ratio with respect to the rate of rotation of said scanning means;
   readout means associated with said storing means for simultaneously reading out corresponding signals which were stored in said storing means during said at least two successive scan periods; and output means for comparing said signals which are simultaneously read out.

2. The arrangement as recited in claim 1 wherein said readout means comprise a first readout element and a second readout element which are positioned with respect to said storing means at relative positions which are a function of the number of times said scene is scanned per revolution of said scanning means and the fixed ratio of the rates of rotation of said scanning means and said storing means.

3. The arrangement as recited in claim 2 wherein said storing means comprises a cylindrical drum with signal storing matter on the outside surface thereof, said drum being rotatable about an axial axis of rotation with said first and second readout elements being positioned along radials which form an angle definable as $\theta$ which is equal in degrees to $$(360/x) \cdot (1/y)$$

wherein $x$ represents the number of scene scan periods per revolution of said scanning means and $y$ represents the number of revolutions of said scanning means per revolution of said storing means.

4. The arrangement as recited in claim 3 wherein $x$ is an integer not less than one and y is greater than one.

5. The arrangement as recited in claim 1 wherein said output means comprises comparing means for providing an output whenever the amplitude difference between the corresponding signals which are simultaneously read out by said readout means exceeds a preselected threshold level.

6. A system for detecting changes in the content of a scene comprising:

first raster scanning means, including rotatable scanning means for scanning said scene during each of a succession of scan periods and for deriving signals during each scan period which are indicative of scene content, said scanning means comprising a prismatic mirror in the form of a polygon having a plurality of mirror faces and rotatable about an axis of rotation, with adjacent mirror faces making predetermined different angles with said axis of rotation, for affording a raster scan of the scene as said prismatic mirror is rotated about its axis of rotation;

rotatable rigid signal storing means for concurrently storing the signals derived by said first means during at least two successive scan periods;

rotation control means coupled to said rotatable scanning means and to said signal storing means for controlling said signal storing means to rotate at a rate which is at a fixed ratio with respect to the rate of rotation of said scanning means;

readout means associated with said storing means for simultaneously reading out corresponding signals which were stored in said storing means during said at least two successive scan periods; and output means for comparing said signals which are simultaneously read out.

7. The arrangement as recited in claim 6 wherein said storing means comprises a cylindrical drum with signal storing matter on the outside surface thereof, said readout means comprise a first readout element and a second readout element which are positioned with respect to said storing means at relative positions which are a function of the number of times said scene is scanned per revolution of said scanning means and the fixed ratio of the rates of rotation of said scanning means and said storing means, said drum being rotatable about an axial axis of rotation with said first and second readout elements being positioned along radials which form an angle definable as $\theta$ which is equal in degrees to $(360/x) \cdot (1/y)$ wherein $x$ represents the number of scene scan periods per revolution of said scanning means and $y$ represents the number of revolutions of said scanning means per revolution of said storing means.

8. The arrangement as recited in claim 7 wherein said signal storing matter is magnetic material, and said first and second readout elements are magnetic read heads.

9. The arrangement as recited in claim 8 wherein x is an integer not less than one and y is greater than one 10. The arrangement as recited in claim 9 wherein said output means comprises comparing means for providing an output whenever the amplitude difference between the corresponding signals which are simultaneously read out by said readout means exceeds a preselected threshold level.

* * * * *